United States Patent
Hao (10) Patent No.: US 8,737,248 B2
(45) Date of Patent: May 27, 2014

(54) METHOD AND SYSTEM FOR TRACKING SIGNALING IN AUTOMATICALLY SWITCHED OPTICAL NETWORK

(75) Inventor: Yipeng Hao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 159 days.

(21) Appl. No.: 13/259,000

(22) PCT Filed: Sep. 1, 2009

(86) PCT No.: PCT/CN2009/073672
§ 371 (c)(1),
(2), (4) Date: Dec. 13, 2011

(87) PCT Pub. No.: WO2010/145092
PCT Pub. Date: Dec. 23, 2010

(65) Prior Publication Data
US 2012/0114328 A1     May 10, 2012

(30) Foreign Application Priority Data
Jun. 15, 2009 (CN) .......................... 2009 1 0087038

(51) Int. Cl.
G01R 31/08 (2006.01)

(52) U.S. Cl.
USPC .................................. 370/252; 398/9; 398/10

(58) Field of Classification Search
None
See application file for complete search history.

(56) References Cited

U.S. PATENT DOCUMENTS

| | | | |
|---|---|---|---|
| 2003/0217089 A1* | 11/2003 | Bakow et al. | 709/100 |
| 2005/0276386 A1 | 12/2005 | Ethier et al. | |
| 2006/0026225 A1* | 2/2006 | Canali et al. | 709/200 |
| 2006/0221837 A1* | 10/2006 | Gardner et al. | 370/241 |
| 2009/0074404 A1* | 3/2009 | Suryaputra et al. | 398/5 |
| 2009/0249340 A1* | 10/2009 | Akiyama et al. | 718/100 |

FOREIGN PATENT DOCUMENTS

| | | |
|---|---|---|
| CN | 1529447 A | 9/2004 |
| CN | 1571368 A | 1/2005 |
| CN | 1 870 532 A | 11/2006 |
| CN | 101207883 A | 6/2008 |

\* cited by examiner

*Primary Examiner* — David Oveissi
(74) *Attorney, Agent, or Firm* — McGarry Bair PC (57) ABSTRACT

The present invention discloses a method and system for tracking signaling in an automatically switched optical network (ASON), wherein the method comprises a step of setting a signaling tracking filtering condition for a corresponding signaling tracking task, and the following steps that: an ASON node collects and reports a received or sent signaling message when there exists a task tracking request; and when the reported signaling message is determined meeting the signaling tracking filtering condition of the current signaling tracking task, the reported signaling message is resolved to obtain the signaling message of the signaling tracking task. The invention realizes a signaling tracking scheme in an ASON and can establish multiple signaling tracking tasks at the same time, as each signaling tracking task can set its own signaling tracking filtering condition; a flexible signaling tracking is achieved. The invention provides a means for resolving a signaling process and locating a fault in a field debugging and a subsequent operation and maintenance, thus improving the efficiency of fault location.

9 Claims, 5 Drawing Sheets

Fig. 7

METHOD AND SYSTEM FOR TRACKING SIGNALING IN AUTOMATICALLY SWITCHED OPTICAL NETWORK

CROSS-REFERENCE TO RELATED APPLICATIONS

This application is a National Phase application of International Application No. PCT/CN2009/073672, filed Sep. 1, 2009, which claims the benefit of Chinese Patent Application No. 200910087038.6, filed Jun. 15, 2009, both of which are incorporated herein by reference in their entirety.

FIELD OF THE INVENTION

The present invention relates to a signaling tracking technology, in particular to a method and system for tracking signaling in an automatically switched optical network (ASON).

BACKGROUND OF THE INVENTION

With the continuous development of information technologies and the mushrooming of voice, data, multimedia services and other high-speed services, there arises a requirement on the intellectualization of conventional transport networks. Moreover, the ASON develops and matures gradually, and it begins to expand to WDM from SDH and is even capable of realizing a uniform control on multiple transport plane layers or on different domains. Therefore, ASON will be applied in more and more fields.

ASON technology makes a transport network intelligent by adding a control plane to the transport network and introducing the GMPLS protocols. The GMPLS protocols specifically comprise RSVP-TE, OSPF and link management protocols. The function of an ASON is mainly realized through the interaction and coordination control of the signaling and protocol of multiple ASON nodes. Therefore, a faulted ASON node in a network can be quickly located by capturing the signaling or protocol used between nodes.

At present, in a mobile communication system, the capturing of a message communicated between nodes is typically realized by a packet capturing tool installed on a management background, such as ethereal or wireshark. The packet capturing tool can selectively capture a desired data packet by setting the filtering conditions such as source IP address, the target IP address, or the protocol type of a packet. However, directly applying a packet capturing tool in an ASON will cause the following problems:

1) with the expansion of network services and the growing in the number of network service subscribers, the topology of an ASON will become more and more complicated. The number of the nodes of the ASON will grow increasingly, while a management background can only perform a packet capture analysis on one ASON node at a time. Therefore, when it is needed to track (e.g. establish a service) a signaling that is completed through the cooperation of multiple nodes, each ASON node is required to correspond to a management platform, which will cause a waste on network sources and make network structure more complicated;

2) even if multiple management backgrounds are used to capture packets, it is difficult to guarantee that the data of network elements of multiple ASON nodes are uniformly resolved according to a data sequence;

3) the filtering conditions offered by existing packet capturing tools are inflexible and are therefore inapplicable to an ASON; and 4) as a packet capturing tool captures all the signaling of an ASON node, if there are multiple services on the ASON node, it is impossible to find the message corresponding to a desired service from the captured packet.

In order to locate a fault in a network, an excellent solution that is currently provided for a mobile communication system in this industry is signaling tracking. Signaling tracking is an auxiliary tool installed on a network management background and playing an important role in the operation maintenance of telecommunication networks. By tracking and recording a signaling message between network element nodes, signaling tracking provides an important means for a subsequent signaling process analysis and fault location.

However, signaling tracking is seldom applied in optical transmission field due to some features of optical transmission network. As there are much protocol interaction and signaling interaction in an ASON and there has been provided no method for tracking signaling in an ASON, it is urgent to introduce a signaling tracking technology in an ASON to locate a fault in the network.

SUMMARY OF THE INVENTION

In order to address the problems existing in related technologies and realize a signaling tracking in an ASON, the main objective of the present invention is to provide a method and system for tracking signaling in an automatically switched optical network to realize a proper signaling tracking in an ASON.

In order to achieve the purpose above, in accordance with one aspect of the present invention, a method for tracking signaling in an automatically switched optical network is provided.

The method provided in the present invention for tracking signaling in an automatically switched optical network comprises a step of setting a signaling tracking filtering condition for a corresponding signaling tracking task, and further comprises the steps that: an ASON node collects and reports a received or sent signaling message when there exists a task tracking request; when the reported signaling message is determined to meet the signaling tracking filtering condition of the current signaling tracking task, the reported signaling message is resolved to obtain the signaling message of the signaling tracking task.

Preferably, before the ASON node collects and reports a received or sent signaling message, the method further comprises the steps of: determining whether the ASON node is in a signaling tracking state, if so, continuing to execute the step that the ASON node collects and reports a received or sent signaling message, otherwise, ending the flow.

Preferably, in the case where the reported signaling message is determined to fail to meet the signaling tracking filtering condition of the current signaling tracking task, the method further comprises the steps of: determining whether there exists another signaling tracking task, if so, returning to execute the step of determining whether the reported signaling message meets the signaling tracking filtering condition of a next signaling tracking task until the signaling tracking tasks are all traversed, otherwise, ending the flow.

Preferably, the method further comprises a step of after receiving a task tracking stopping request, the ASON node stopping the signaling tracking on a corresponding signaling tracking task and subtracts 1 from its own signaling tracking task number, and a step of storing the signaling message of each signaling tracking task automatically or manually.

Preferably, the number of the signaling tracking task is one or more; each signaling tracking task corresponds to a signaling tracking filtering condition; and the signaling tracking filtering condition comprises one, two or combinations of more than two of: tracking all, tracking a designated service ID, tracking the ID of a designated ASON node, and tracking a designated protocol type.

Preferably, the reported signaling message is determined to meet the signaling tracking filtering condition of the current signaling tracking task in the following cases: the filtering condition is tracking the ID of a designated ASON node, and the source IP address or the target IP address of the signaling message is the same as the IP address of the designated ASON node; or the filtering condition is tracking a designated service ID, and a service tetrad extracted from the decoding of the signaling message matches the designated service ID; or the filtering condition is tracking a designated protocol type, and the protocol type of the signaling message matches the protocol type designated in the filtering condition.

In order to achieve the purpose above, in accordance with another aspect of the present invention, a system for tracking signaling in an automatically switched optical network is provided.

The system provided in the present invention for tracking signaling in an automatically switched optical network (ASON) comprises a network management center and an ASON node, wherein the network management center is adapted to manage signaling tracking tasks and process a reported signaling message that meets the signaling tracking filtering condition of a current signaling tracking task to obtain the signaling message of the signaling tracking task; and the ASON node is adapted to report a received or sent signaling message according to a task tracking request of the network management center.

Preferably, the ASON node comprises a control module and a signaling collector, wherein the control module is adapted to receive a task tracking request from the network management center, send a collection notice to the signaling collector, and report a signaling message received from the signaling collector to the network management center; and the signaling collector is adapted to collect a received or sent signaling message and output the signaling message to the control module.

Preferably, the control module is further adapted to determine, after receiving a task tracking request, whether the ASON node is in a signaling tracking state, and send a collection notice to the signaling collector if the ASON node is in a signaling tracking state, or send a collection closing notice to the signaling collector if the ASON node is not in the signaling tracking state; and the control module is further adapted to send a collection stopping notice to the signaling collector according to a task tracking stopping request of the network management center to stop the signaling tracking on a corresponding signaling tracking task.

Preferably, the network management center comprises a signaling collection pool, a task management module, a signaling resolution module and a signaling management module, wherein the signaling resolution module and the signaling management module are called by the task management module; the task management module is adapted to generate a new task instance according to a created signaling tracking task and the signaling tracking filtering condition, send a task tracking request to the signaling collection pool, call the signaling resolution module to process the signaling message after receiving the reported signaling message that meets the signaling tracking filtering condition of the current signaling tracking task, and send a task tracking stopping request to the signaling collection pool according to a signaling tracking stopping task; the signaling collection pool is adapted to receive a task tracking request from the task management module, establish correspondence relations between a signaling tracking task and a corresponding signaling tracking filtering condition and between different signaling tracking tasks, send a task tracking request to a designated ASON node according to a signaling tracking filtering condition, receive a signaling message reported by the ASON node, traverse all signaling tracking tasks, and output the reported signaling message to the task management module when the reported signaling message is determined to meet the signaling tracking filtering condition of the current signaling tracking task; the signaling resolution module is adapted to be called by the task management module to decode the reported signaling message and output the decoded signaling message to the signaling management module; the signaling management module is adapted to display the decoded signaling messages corresponding to different signaling tracking tasks; the signaling collection pool is adapted to forward a received signaling tracking stopping request to the ASON node; and the signaling management module is adapted to store the signaling message of each signaling tracking task.

It can be seen from the technical solution provided by the present invention that the method disclosed in the present invention realizes a signaling tracking in an ASON by setting a signaling tracking filtering condition for a corresponding signaling tracking task, enabling an ASON node to collect and report a received or sent signaling message when there exists a task tracking request, and resolving the reported signaling message to obtain the signaling message of the signaling tracking task when it is determined that the reported signaling message meets the signaling tracking filtering condition of the current signaling tracking task. Moreover, the method disclosed in present invention enables the synchronous establishment of multiple signaling tracking tasks, each of which can set its own signaling tracking filtering condition, thus realizing flexible tracking on signaling. The signaling tracking method of the present invention provides, in a complicated ASON topology, a means for a signaling process analysis and a fault location in a field debugging and subsequent operation maintenance and improves the efficiency of fault location.

BRIEF DESCRIPTION OF THE DRAWINGS

The drawings illustrated herein are provided for a better understanding of the present invention and form one part of this disclosure, and the exemplary embodiments of the present invention and the description thereof are for explaining the invention but not unduly limiting the invention. In the drawings.

DETAILED DESCRIPTION OF THE INVENTION

Functional Overview

Considering the problems existing in related technologies, the present invention discloses a solution for tracking signaling in an automatically switched optical network, the processing principle of which lies in that: a signaling tracking filtering condition is set for a corresponding signaling tracking task, an ASON node collects and reports a received or sent signaling message when there exists a task tracking request, and when the reported signaling message is determined meeting the signaling tracking filtering condition of the current signaling tracking task, the reported signaling message is resolved to obtain the signaling message of the signaling tracking task. This solution can realize a flexible tracking on signaling and improve the efficiency of fault location.

Figure 1:
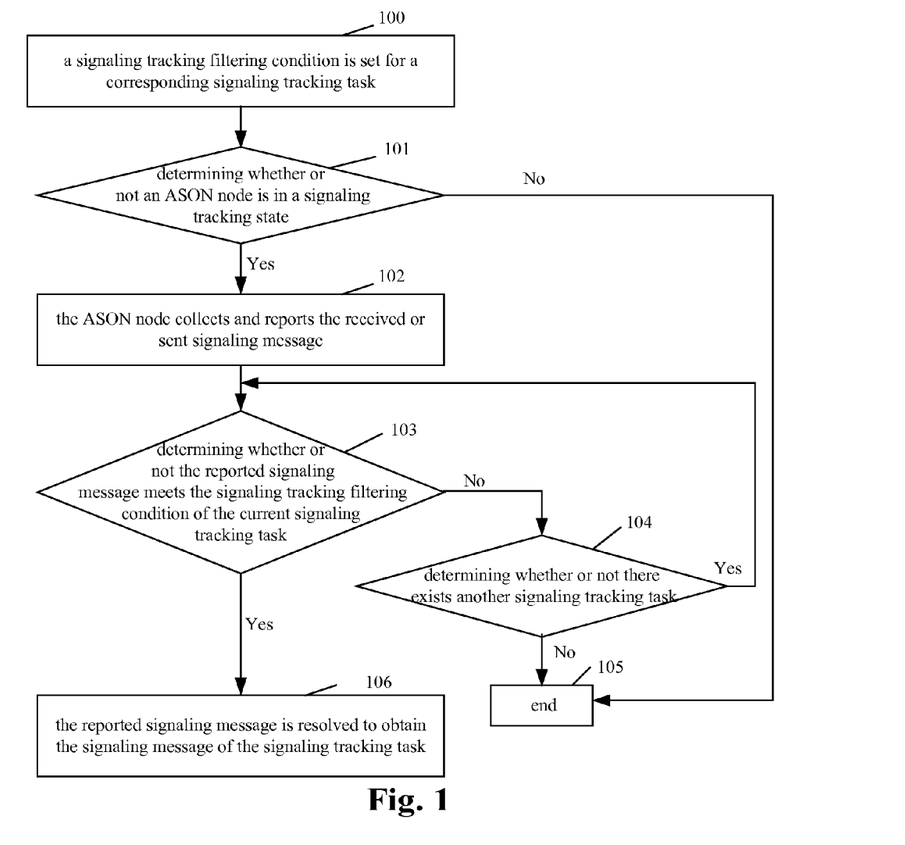
FIG. 1 is a flow chart of the method for tracking signaling in an automatically switched optical network according to embodiments of the present invention.

FIG. 1 is a flow chart of the method for tracking signaling in an automatically switched optical network according to embodiments of the present invention. As shown in FIG. 1, when there is a task tracking request, the method comprises the following steps.

Step 100: a signaling tracking filtering condition is set for a corresponding signaling tracking task.

The signaling tracking task and the signaling tracking filtering condition thereof are created by a network manager via an interface provided by a network management center. There may be one or more signaling tracking tasks, each of which corresponds to a signaling tracking filtering condition. The signaling tracking filtering conditions of the signaling tracking tasks may be different. The correspondence relations between a signaling tracking task and a corresponding signaling tracking filtering condition and between different signaling tracking tasks may be established in a link form.

Based on the features of the ASON, the signaling tracking filtering condition comprises one, or two, or combinations of more than two of: tracking all, tracking a designated service ID, tracking the ID of a designated ASON node, and tracking a designated protocol type, wherein protocol types include OSPF routing protocol, LMP link resource management protocol, RSVP-TE protocol, and sub-protocols of the mentioned protocols. For instance, the OSPF protocol includes sub-protocols such as OSPF Hello, OSPF LSR and OSPF LSU.

In order to relieve the pressure on the processing of the signaling message, the method according to the embodiment of the present invention may further comprise a Step 101: determine whether an ASON node is in a signaling tracking state, if so, proceed to Step 102, otherwise, proceed to Step 105.

Specifically, this step may be realized as follows: the number of signaling tracking tasks is accumulated and recorded every time the ASON node receives a task tracking request; if the number of the signaling tracking task (tasks) of the ASON node is greater than 0, then the ASON node is in a signaling tracking state, and the signaling message needs reporting; that is, the ASON executes Step 102 (reporting the signaling message) only after receiving a task tracking request and makes no signaling message reporting even after receiving or sending the signaling message if no task tracking request is received, thus avoiding the processing on an undesired signaling message and relieving the pressure on the processing of signaling messages.

Step 102: the ASON node collects and reports the received or sent signaling message.

Collecting the signaling message is implemented by making a copy of the received or sent signaling message.

Step 103: determine whether the reported signaling message meets the signaling tracking filtering condition of the current signaling tracking task, if so, Step 106 is executed; otherwise, Step 104 is executed.

For the different filtering conditions, the determination on whether the signaling message meets the signaling tracking filtering condition of the current signaling tracking task is carried out as follows: 1) if the filtering condition is tracking the ID of a designated ASON node, determine whether the source IP address or the target IP address of the signaling message is the same as the IP address of the designated ASON node, if so, then determine that the signaling message meets the signaling tracking filtering condition of the current signaling tracking task; 2) if the filtering condition is tracking a designated service ID, preliminarily decode the content of an RSVP signaling message to determine whether the extracted service tetrad matches the designated service ID, if so, then determine that the signaling message meets the signaling tracking filtering condition of the current signaling tracking task, wherein the service tetrad comprises the ID of the source node of the service, the ID of the target node of the service, the ID of the service and a connection ID; and 3) if the filtering condition is tracking a designated protocol type, determine whether the protocol type of the signaling message matches the protocol type designated in the filtering condition, if so, determine that the signaling message meets the signaling tracking filtering condition of the current signaling tracking task.

Step 104: determine whether there exists other signaling tracking task, if so, the flow is returned to Step 103, otherwise, Step 105 is executed.

All signaling tracking tasks need to be traversed if there are multiple signaling tracking tasks, and Step 106 is executed as long as the reported signaling message meets the signaling tracking condition of one of the signaling tracking tasks so as to obtain the signaling tracked by different signaling tracking tasks.

Step 105: the flow is ended.

Step 106: the reported signaling message is resolved to obtain the signaling message of the signaling tracking task.

The resolution is mainly carried out by decoding according to the protocol type and the protocol sub-type of the signaling message, and the message bodies of OSPF, RSVP and LMP protocol defined in the standards. The specific process is commonly known by those skilled in the art, thus no detailed description is given herein.

The method provided in the embodiments of the present invention further comprises a step of storing the signaling message of each signaling tracking task, wherein the storing can be automatically or manually; further, the signaling messages generated in a period of time can also be stored. The specific process is commonly known by those skilled in the art, thus no detailed description is given herein.

The method provided in an embodiment of the present invention further comprises a step that after receiving a task tracking stopping request, the ASON node stops the signaling tracking on a corresponding signaling tracking task and subtracts 1 from its own signaling tracking task number, and continues to perform signaling tracking on the rest signaling tracking tasks if the number of the signaling tracking tasks is still greater than 0, or stops each signaling tracking and message reporting if the number of the signaling tracking task is 0, which means that the ASON node is not in a signaling tracking state.

Figure 2:
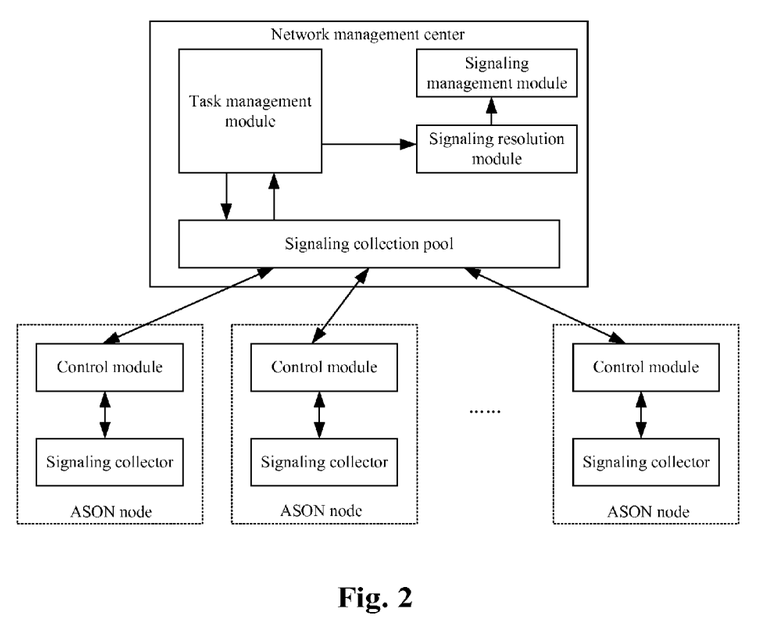
FIG. 2 is a schematic diagram illustrating the structure of the system for tracking signaling in an automatically switched optical network according to embodiments of the present invention.

FIG. 2 is a schematic diagram illustrating the structure of the system for tracking signaling in an automatically switched optical network according to embodiments of the present invention. As shown in FIG. 2, the system comprises a network management center and an ASON node.

The network management center is adapted to manage signaling tracking tasks and process the reported signaling messages that meet the signaling tracking filtering condition of the current signaling tracking task to obtain the signaling messages of the signaling tracking tasks.

The ASON node is adapted to report a received or sent signaling message according to a task tracking request of the network management center.

The ASON node is further adapted to report the signaling message to the network management center after determining that the ASON node itself is in a signaling tracking state, or stop each signaling tracking after determining that the ASON node itself is not in a signaling tracking state.

The ASON node is further adapted to stop the signaling tracking on a corresponding signaling tracking task according to a task tracking stopping request of the network management center.

As shown in FIG. 2, the ASON node comprises a control module and a signaling collector.

The control module is adapted to receive a task tracking request from the network management center, send a collection notice to the signaling collector, and report a signaling message received from the signaling collector to the network management center.

Further, the control module is adapted to, after receiving a task tracking request, determine whether the ASON node is in a signaling tracking state, and send a collection notice to the signaling collector if the ASON node is in a signaling tracking state, or send a collection closing notice to the signaling collector if the ASON node is not in a signaling tracking state.

Further, the control module is adapted to send a collection stopping notice to the signaling collector according to a task tracking stopping request of the network management center to stop the signaling tracking on a corresponding signaling tracking task.

The signaling collector is adapted to collect a received or sent signaling message and output the signaling message to the control module.

As shown in FIG. 2, the network management center comprises a signaling collection pool, a task management module, a signaling resolution module and a signaling management module, wherein the signaling resolution module and the signaling management module are called by the task management module.

The task management module is adapted to generate a new task instance according to a created signaling tracking task and signaling tracking filtering condition, send a task tracking request to the signaling collection pool, call, after receiving the reported signaling message meeting the signaling tracking filtering condition of the current signaling tracking task, the signaling resolution module to process the signaling message. The task management module is further adapted to send a task tracking stopping request to the signaling collection pool according to a signaling tracking stopping task.

The signaling collection pool is adapted to receive a task tracking request from the task management module, establish correspondence relations between a signaling tracking task and a corresponding signaling tracking filtering condition and between different signaling tracking tasks, send a task tracking request to a designated ASON node according to a signaling tracking filtering condition, receive a signaling message reported by the ASON node, traverse all signaling tracking tasks, and output the reported signaling message to the task management module when the reported signaling message is determined to meet the signaling tracking filtering condition of the current signaling tracking task. The signaling collection pool is further adapted to forward a received signaling tracking stopping request to the ASON node.

The signaling resolution module is adapted to be called by the task management module to decode the reported signaling message and output the decoded signaling message to the signaling management module.

The signaling management module is adapted to display the decoded signaling messages corresponding to different signaling tracking tasks. The signaling management module is further adapted to store the signaling message of each signaling tracking task.

Figure 3:
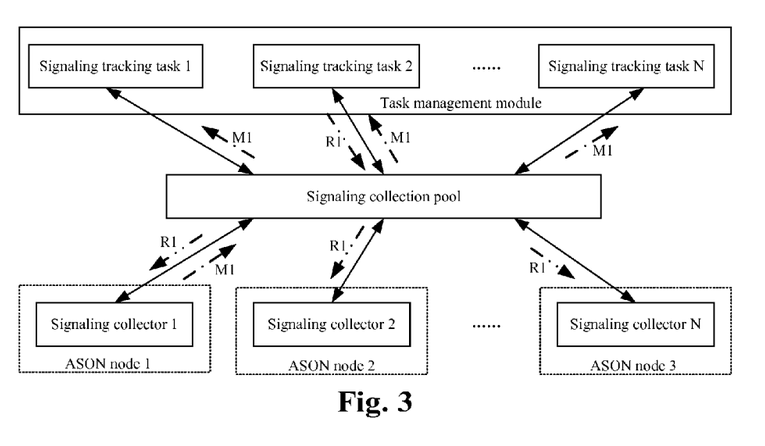
FIG. 3 is a schematic diagram illustrating the relation among multiple signaling tracking tasks, a signaling collection pool and a signaling collector according to embodiments of the present invention.

FIG. 3 is a schematic diagram illustrating the relation among multiple signaling tracking tasks, a signaling collection pool and a signaling collector. As shown by the bold single-dash-dot line in this figure, for a corresponding signaling message 1 (M1) reported by a signaling collector (assumed to be signaling collector 1), the signaling collection pool outputs the reported M1 to the current signaling tracking tasks 1, 2 and 3 in a task management module respectively after traversing all signaling tracking tasks and determining that the reported M1 meets all the signaling tracking filtering conditions of the signaling tracking tasks 1, 2 and 3.

As shown by the bold double-dash-dot line in FIG. 3, for a corresponding task tracking request (R1) of a signaling tracking task (assumed to be signaling collector 1), the signaling collection pool sends R1 to ASON nodes 1-$n$ after determining, according to a signaling tracking filtering condition, that designated ASON nodes comprise all ASON nodes (that is, ASON 1-ASON n).

The solution provided in the embodiment of the present invention realizes a signaling tracking in an ASON, and enables the synchronous establishment of multiple signaling tracking tasks. Each signaling tracking task can set its own signaling tracking filtering condition. In a complicated ASON topology, the signaling tracking method of the present invention provides a means for signaling process analysis and locating faults, which can be applied in a field debugging and subsequent operation maintenance, and improves efficiency of locating faults.

The present invention is described below in detail by reference to several embodiments in conjunction with FIG. 2.

Figure 4:
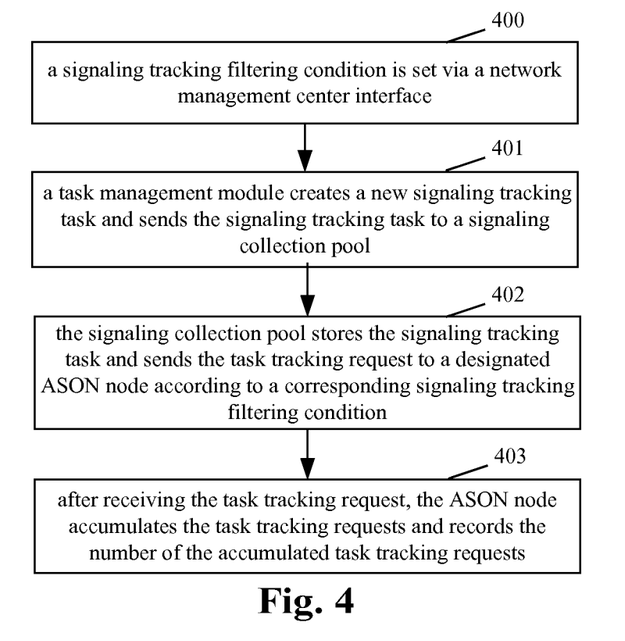
FIG. 4 is a flow chart of the initiation of a task tracking request according to embodiments of the present invention.

FIG. 4 is a flow chart of the initiation of a task tracking request according to an embodiment of the present invention. As shown in FIG. 4, this flow comprises the following steps.

Step 400: a signaling tracking filtering condition is set via a network management center interface.

The signaling tracking filtering condition specifically comprises designating one or any combinations of the ID of a service to be tracked, the ID of an ASON node to be tracked and the protocol type to be tracked.

Step 401: a task management module creates a new signaling tracking task and sends the signaling tracking task to a signaling collection pool.

The task management module first locally creates a signaling tracking task instance, which has a signaling resolution function and a signaling management function and is capable of receiving signaling messages from the signaling collection pool independently; that is, the task management module calls its signaling resolution module and signaling management module for different signaling tracking tasks, and sends a task tracking request to the signaling collection pool after creating the task instance successfully.

Step 402: the signaling collection pool stores the signaling tracking task and sends the task tracking request to a designated ASON node according to a corresponding signaling tracking filtering condition.

In this step, after receiving the task tracking request, the signaling collection pool sends the task tracking request to a designated ASON node according to a signaling tracking filtering condition corresponding to the signaling tracking task, and meanwhile, adds the signaling tracking task and the signaling tracking filtering condition thereof in a task link list in the signaling collection pool for a subsequent traverse.

Step 403: after receiving the task tracking request, the ASON node accumulates the task tracking requests and records the number of the accumulated task tracking requests.

After receiving the task tracking request, the ASON node adds the signaling tracking task number of the ASON node by 1 to indicate itself in a signaling tracking state.

Figure 5:
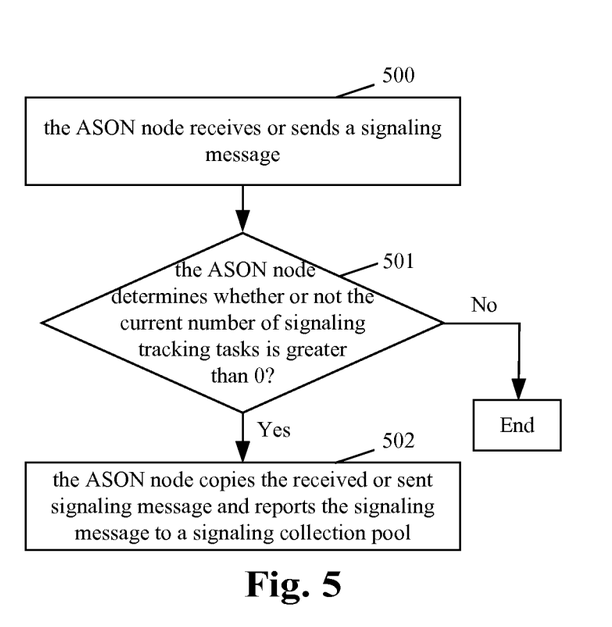
FIG. 5 is a flow chart of the reporting of a signaling message by an ASON node according to embodiments of the present invention.

FIG. 5 is a flow chart of reporting of a signaling message by an ASON node according to an embodiment of the present invention. As shown in FIG. 5, this flow comprises the following steps.

Step 500: the ASON node receives or sends a signaling message.

The ASON node receives a signaling message sent by another ASON node or sends a signaling message to another ASON node.

Step 501: the ASON node determines whether the current number of signaling tracking tasks is greater than 0, if so, executes Step 502, otherwise, ends the flow.

If the current number of signaling tracking tasks is greater than 0, then the ASON node is in a signaling tracking state, otherwise, the ASON node is not in a signaling tracking state, which means the reporting of a signaling message is not needed, and the flow is ended.

Step 502: the ASON node copies the received or sent signaling message and reports the signaling message to a signaling collection pool.

Figure 6:
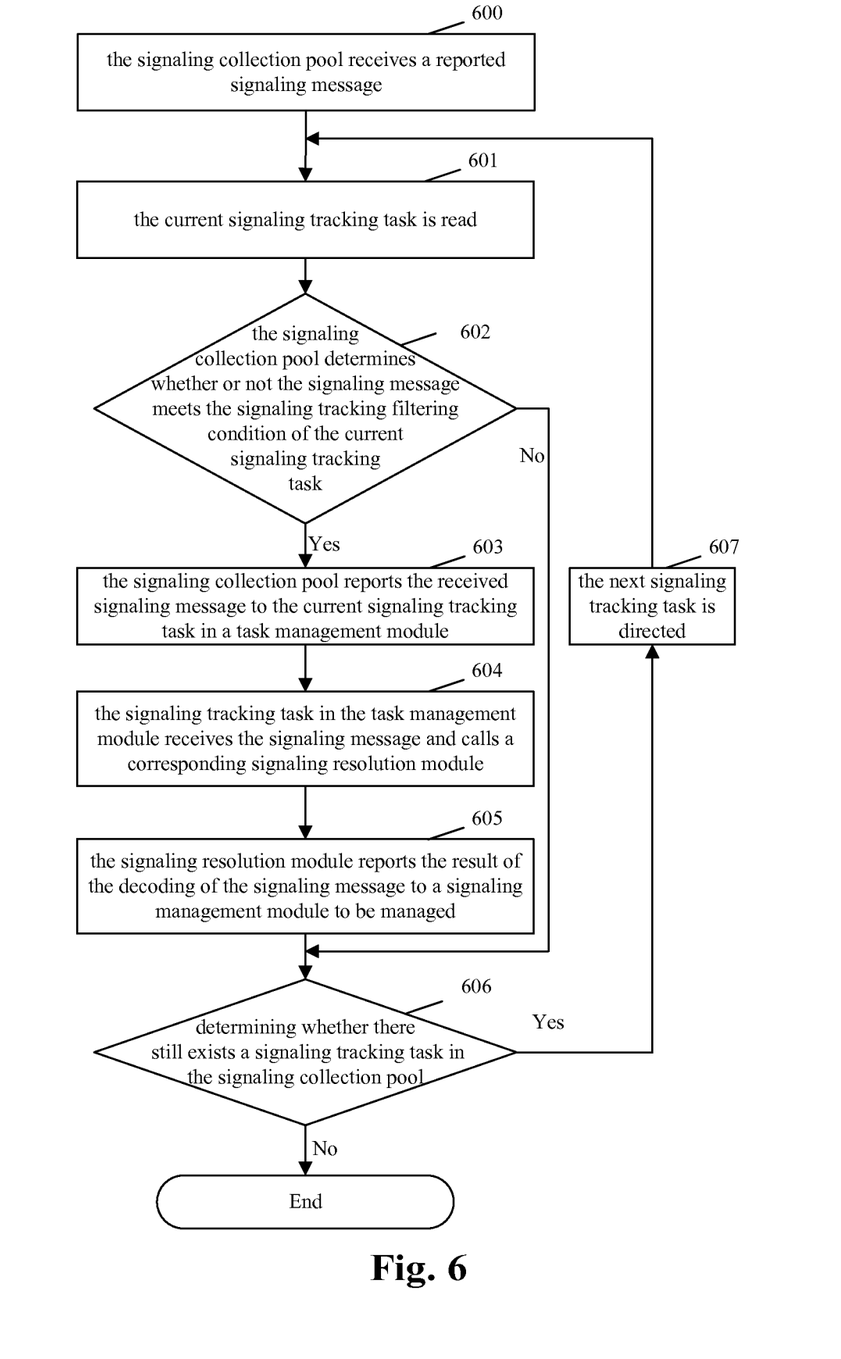
FIG. 6 is a flow chart of the processing of a reported signaling message by a signaling collection pool according to embodiments of the present invention.

FIG. 6 is a flow chart of the processing of a reported signaling message by a signaling collection pool according to an embodiment of the present invention. As shown in FIG. 6, this flow comprises the following steps.

Step 600: the signaling collection pool receives a reported signaling message.

Step 601: the current signaling tracking task is read; that is, the current signaling tracking task is read out from a task link list.

Step 602: the signaling collection pool determines whether the signaling message meets the signaling tracking filtering condition of the current signaling tracking task, if so, executes Step 603, otherwise, executes Step 606.

Step 603: the signaling collection pool reports the received signaling message to the current signaling tracking task in a task management module.

Step 604: the signaling tracking task in the task management module receives the signaling message and calls a corresponding signaling resolution module.

Step 605: the signaling resolution module reports the result of the decoding of the signaling message to a signaling management module to be managed.

The reported signaling message is a binary bit stream, and therefore the reported signaling message should be decoded in accordance with a format specified in a standard protocol.

Step 606: determine whether there still exists a signaling tracking task in the signaling collection pool, if so, Step 607 is executed; otherwise, the flow is ended.

As there may be multiple signaling tracking tasks in the signaling collection pool, all the signaling tracking tasks need to be traversed.

Step 607: the next signaling tracking task is directed and the process is returned to Step 601.

Figure 7:
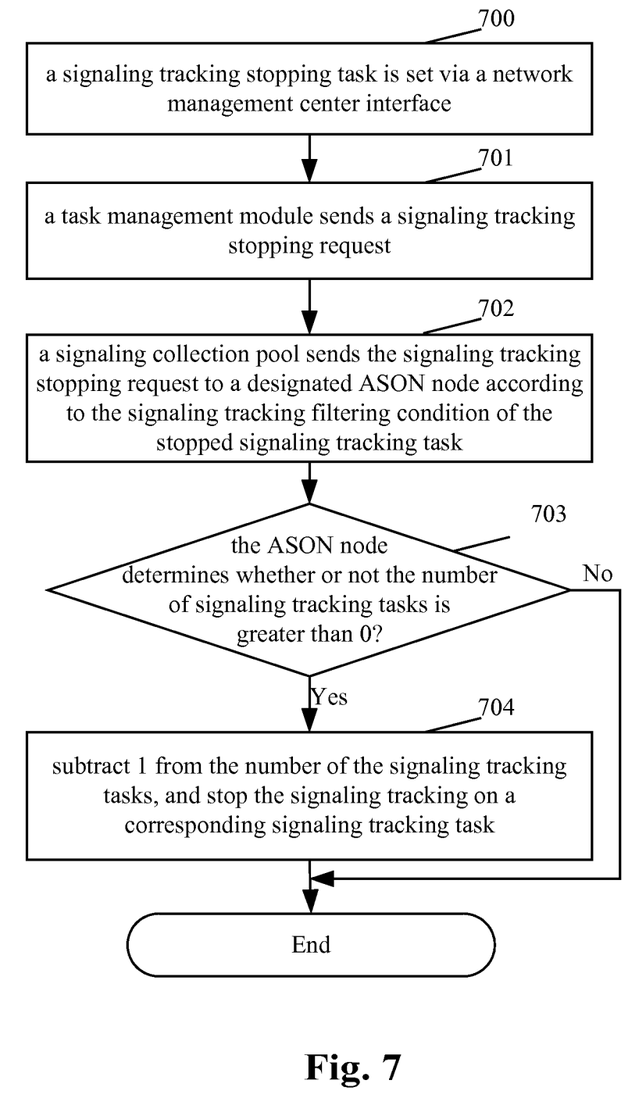
FIG. 7 is a flow chart of the stopping of a signaling tracking task according to embodiments of the present invention.

FIG. 7 is a flow chart of the stopping of a signaling tracking task according to an embodiment of the present invention. As shown in FIG. 7, this flow comprises the following steps.

Step 700: a signaling tracking stopping task is set via a network management center interface.

Step 701: a task management module sends a signaling tracking stopping request.

Step 702: a signaling collection pool sends the signaling tracking stopping request to a designated ASON node according to the signaling tracking filtering condition of the stopped signaling tracking task.

Specifically, the signaling collection pool first finds a signaling tracking task to be stopped from a task link list, then sends a signaling tracking stopping request to a designated ASON node according to a signaling tracking filtering condition corresponding to the signaling tracking task, and meanwhile deletes the signaling tracking task from the task link list so that the signaling collection pool will no longer report a signaling message for the signaling tracking task.

Step 703: the ASON node determines whether the number of signaling tracking tasks is greater than 0, if so, executes Step 704, otherwise, ends the flow.

If the number of signaling tracking tasks is 0, then no signaling message is reported to the signaling collection pool.

Step 704: subtract 1 from the number of the signaling tracking tasks, and stop the signaling tracking on a corresponding signaling tracking task.

According to another embodiment of the present invention, a computer-readable medium is provided, on which computer-executable instructions are stored. When the instructions are executed by a computer or processor, the computer or processor carries out the processing of the steps illustrated in FIG. 1, FIG. 4-FIG. 7. Preferably, the computer or processor carries out one or more of the aforementioned embodiments.

The solution provided in the embodiments of the present invention for tracking signaling in an ASON can realize a flexible signaling tracking. It provides a means for the signaling process analysis and locating faults for the debugging in the field and the subsequent operation and maintenance, and improves the efficiency of locating faults.

In addition, as no modification is made to existing system architecture and processing flow, the present invention can be easily implemented and applied in related technical field and has high industrial applicability.

The above mentioned are only preferred embodiments of the invention but not limitation for the protection scope of the invention. Various modification, equivalents and improvements can be devised by those skilled in this art, and it should be understood that any modification, equivalent and improvement devised without departing from the spirit and scope of the invention belong to the protection scope of the invention.

What is claimed is:

1. A method for tracking signaling in an automatically switched optical network (ASON), comprising a step of setting a signaling tracking filtering condition for a corresponding signaling tracking task, and further comprising the steps of:

an ASON node collecting and reporting a received or sent signaling message when there exists a task tracking request; and when the reported signaling message being determined to meet the signaling tracking filtering condition of current signaling tracking task, the reported signaling message being analyzed to obtain the signaling message of the signaling tracking task;

wherein the number of the signaling tracking task is one or more; each signaling tracking task corresponds to a signaling tracking filtering condition;

and the signaling tracking filtering condition comprises one, two or combinations of more than two of: tracking all, tracking a designated service ID, tracking the ID of a designated ASON node, and tracking a designated protocol type.

2. The method according to claim 1, wherein before the ASON node collecting and reporting a received or sent signaling message, the method further comprises the steps of:
determining whether the ASON node is in a signaling tracking state, and if so, continuing to execute the step that the ASON node collects and reports a received or sent signaling message, otherwise, ceasing the subsequent steps.

3. The method according to claim 2, wherein in the case where the reported signaling message is determined to fail to meet the signaling tracking filtering condition of the current signaling tracking task, the method further comprises the steps of:
determining whether there exists another signaling tracking task, and if so, returning to execute the step of determining whether the reported signaling message meets the signaling tracking filtering condition of a next signaling tracking task until the signaling tracking tasks are all traversed, otherwise, ceasing the subsequent steps.

4. The method according to claim 1, wherein in the case where the reported signaling message is determined to fail to meet the signaling tracking filtering condition of the current signaling tracking task, the method further comprises the steps of:
determining whether there exists another signaling tracking task, and if so, returning to execute the step of determining whether the reported signaling message meets the signaling tracking filtering condition of a next signaling tracking task until the signaling tracking tasks are all traversed, otherwise, ceasing the subsequent steps.

5. The method according to claim 1, wherein the method further comprises a step of after receiving a task tracking stopping request, the ASON node stopping the signaling tracking on a corresponding signaling tracking task and subtracting 1 from its own signaling tracking task number, and
a step of storing the signaling message of each signaling tracking task automatically or manually.

6. The method according to claim 1, wherein the reported signaling message is determined to meet the signaling tracking filtering condition of the current signaling tracking task in the following cases:
the filtering condition is tracking the ID of a designated ASON node, and the source IP address or the target IP address of the signaling message is the same as the IP address of the designated ASON node; or
the filtering condition is tracking a designated service ID, and a service tetrad extracted from the decoding of the signaling message matches the designated service ID; or
the filtering condition is tracking a designated protocol type, and the protocol type of the signaling message matches the protocol type designated in the filtering condition.

7. A system for tracking signaling in an automatically switched optical network (ASON), comprising a network management center and an ASON node, wherein
the network management center is configured to manage signaling tracking tasks and process a reported signaling message that meets a signaling tracking filtering condition of a current signaling tracking task to obtain a signaling message of the current signaling tracking task; and the ASON node is configured to report a received or sent signaling message according to a task tracking request of the network management center;

wherein the ASON node comprises a control module and a signaling collector, wherein the control module is configured to receive the task tracking request from the network management center, send a collection notice to the signaling collector, and report a signaling message received from the signaling collector to the network management center; and the signaling collector is configured to collect a received or sent signaling message and output the signaling message to the control module.

8. The system according to claim 7, wherein the control module is further configured to determine, after receiving the task tracking request, whether the ASON node is in a signaling tracking state, and send the collection notice to the signaling collector if the ASON node is in a signaling tracking state, or send a collection closing notice to the signaling collector if the ASON node is not in the signaling tracking state, and the control module is further configured to send a collection stopping notice to the signaling collector according to a task tracking stopping request of the network management center to stop the signaling tracking on a corresponding signaling tracking task.

9. The system according to claim 7, wherein the network management center comprises a signaling collection pool, a task management module, a signaling resolution module and a signaling management module, wherein the signaling resolution module and the signaling management module are configured to be called by the task management module;

the task management module is configured to generate a new task instance according to a created signaling tracking task and signaling tracking filtering condition, send the task tracking request to the signaling collection pool, call the signaling resolution module to process the signaling message after receiving the reported signaling message that meets the signaling tracking filtering condition of the current signaling tracking task, and send a task tracking stopping request to the signaling collection pool according to a signaling tracking stopping task;

the signaling collection pool is configured to receive the task tracking request from the task management module, establish correspondence relations between a signaling tracking task and a corresponding signaling tracking filtering condition and between different signaling tracking tasks, send the task tracking request to a designated ASON node according to a signaling tracking filtering condition, receive a signaling message reported by the ASON node, traverse all signaling tracking tasks, and output the reported signaling message to the task management module when the reported signaling message is determined to meet the signaling tracking filtering condition of the current signaling tracking task;

the signaling resolution module is configured to be called by the task management module to decode the reported signaling message and output the decoded signaling message to the signaling management module;

the signaling management module is configured to display the decoded signaling messages corresponding to different signaling tracking tasks;

the signaling collection pool is configured to forward a received signaling tracking stopping request to the ASON node; and the signaling management module is configured to store the signaling message of each signaling tracking task.

* * * * *